United States Patent [19]

Jansons et al.

[11] Patent Number: 4,912,195
[45] Date of Patent: Mar. 27, 1990

[54] PREPARATION OF AROMATIC POLYMERS USING A SPECIFIED QUANTITY OF LEWIS ACID

[75] Inventors: Viktors Jansons, Los Gatos; Heinrich C. Gors, Mountain View, both of Calif.

[73] Assignee: Raychem Corporation, Menlo Park, Calif.

[21] Appl. No.: 376,974

[22] Filed: Jul. 6, 1989

Related U.S. Application Data

[60] Continuation of Ser. No. 186,750, Apr. 25, 1988, abandoned, which is a continuation of Ser. No. 84,668, Aug. 11, 1997, abandoned, which is a division of Ser. No. 922,837, Oct. 23, 1986, Pat. No. 4,709,007, which is a continuation of Ser. No. 594,503, Mar. 29, 1984, abandoned, which is a continuation-in-part of Ser. No. 481,081, Mar. 31, 1983, abandoned.

[51] Int. Cl.$^4$ .............................................. C08G 8/02
[52] U.S. Cl. ..................................... 528/222; 528/223; 528/224; 528/225
[58] Field of Search ................. 528/222, 223, 224, 225

[56] References Cited

U.S. PATENT DOCUMENTS

| | | | |
|---|---|---|---|
| 3,065,205 | 11/1962 | Bonner, Jr. | 528/176 |
| 3,385,825 | 5/1968 | Goodman et al. | 528/176 |
| 3,441,538 | 4/1969 | Marks | 528/176 |
| 3,442,857 | 5/1969 | Thornton | 528/176 |
| 3,516,966 | 6/1970 | Berr | 528/176 |
| 3,524,833 | 8/1970 | Darms | 528/176 |
| 3,767,620 | 11/1971 | Angelo et al. | 528/176 |
| 3,791,890 | 2/1974 | Gander et al. | 528/176 |
| 3,953,400 | 4/1976 | Dahl | 528/206 |
| 3,956,240 | 5/1976 | Dahl et al. | 528/176 |
| 4,008,204 | 3/1977 | Jones | 528/176 |
| 4,052,365 | 10/1977 | Jones | 528/206 |
| 4,229,564 | 10/1980 | Dahl | 528/220 |
| 4,247,682 | 1/1981 | Dahl | 528/176 |
| 4,356,292 | 10/1982 | Sankaran et al. | 528/125 |
| 4,356,298 | 10/1982 | Marvel et al. | 528/125 |
| 4,361,693 | 11/1982 | Jansons | 528/128 |
| 4,396,755 | 8/1983 | Rose | 528/176 |
| 4,398,020 | 8/1983 | Rose | 528/176 |
| 4,698,393 | 10/1987 | Jansons et al. | 525/242 |

FOREIGN PATENT DOCUMENTS

| | | |
|---|---|---|
| 45-18311 | 6/1970 | Japan . |
| 971227 | 9/1964 | United Kingdom . |
| 1019226 | 2/1966 | United Kingdom . |
| 1086021 | 10/1967 | United Kingdom . |
| 1250251 | 10/1971 | United Kingdom . |
| 1340709 | 12/1973 | United Kingdom . |
| 1383393 | 2/1975 | United Kingdom . |
| 1558615 | 1/1980 | United Kingdom . |

OTHER PUBLICATIONS

Olah, "Friedel–Crafts and Related Reactions", vol. III, part 1, pp. 3, 17 (Interscience 1964).

Primary Examiner—John Kight, III
Assistant Examiner—F. Krass
Attorney, Agent, or Firm—Yuan Chao; Edith A. Rice; Herbert G. Burkard

[57] ABSTRACT

A process for producing an aromatic polyketone which comprises polymerizing an appropriate monomer or monomers by a Friedel-Crafts polymerization reaction using a Lewis acid catalyst. A controlling agent such as a Lewis base may be added to the reaction medium and/or the reaction is conducted under specified conditions to control the reaction. The reaction medium comprises, for example, aluminum trichloride as the Lewis acid, an organic Lewis base such as N,N-dimethylformamide or an inorganic Lewis base such as sodium or lithium chloride, and a diluent such as methylene chloride or dichloroethane. The amount of Lewis acid, the amount of Lewis base, the temperature of the reaction and the monomer to diluent molar ratio are varied depending on the monomer system to obtain melt-processable, high molecular weight, substantially linear polymers, for example poly(carbonyl-p-phenylene-oxy-p-phenylene), poly(carbonyl-p-phenylene-oxy-p-phenylene-oxy-p-phenylene), and the like. Copolymers containing up to 30% by weight of an aromatic sulfonyl halide comonomer can also advantageously be produced by this process.

45 Claims, 1 Drawing Sheet

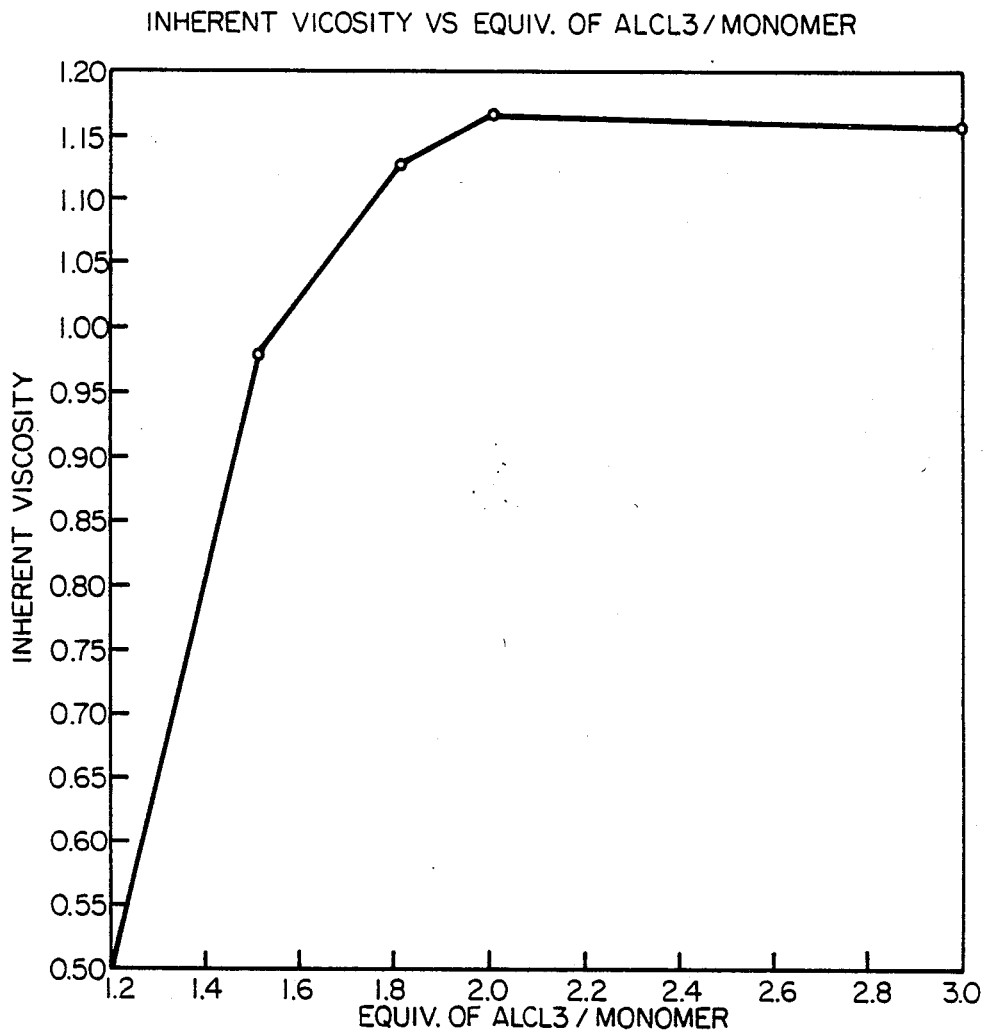
FIG_1

PREPARATION OF AROMATIC POLYMERS USING A SPECIFIED QUANTITY OF LEWIS ACID

This application is a continuation of application Ser. No. 07/186,750, filed Apr. 25, 1988 now abandoned,; which is a continuation of application Ser. No. 07/084,668, filed Aug. 11, 1987, now abandoned; which is a divisional of application Ser. No. 06/922,837, filed Oct. 23, 1986, now U.S. Pat. No. 4,709,007; which is a continuation of application Ser. No. 06/594,503, filed Mar. 29, 1984 now abandoned; which is a continuation-in-part of application Ser. No. 06/481,081, filed Mar. 31, 1983, now abandoned; the disclosures of which are incorporated herein by reference.

BACKGROUND OF THE INVENTION

This invention relates to a method of preparing poly(arylene ketones) and in particular to an electrophilic polymerization process for preparing such polymers.

Poly(arylene ketones), in particular, all paralinked poly(aryl ether ketones), possess many desirable properties, for example, high temperature stability, mechanical strength, and resistance towards common solvents. The preparation of poly(arylene ether ketones) by two different approaches has been described in the literature. The first approach is an electrophilic synthesis in which an aryl ketone linkage is formed. The second is a nucleophilic synthesis in which an aryl ether linkage is formed. This invention is directed to an improved electrophilic synthesis for preparing poly(arylene ketones), in particular all para-linked poly(aryl ether ketones).

In such an electrophilic synthesis, the polymerization step involves the formation of an aryl ketone group from a carboxylic acid or acid derivative group and an aromatic compound containing an aromatic carbon bearing an activated hydrogen atom, i.e. a hydrogen atom displaceable under the electrophilic reaction conditions. The monomer system employed in the polymerization can be, for example, (a) a single aromatic compound containing both a carboxylic acid or acid derivative group as well as an activated hydrogen atom on an aromatic carbon for example, p-phenoxybenzoyl chloride; or (b) a two-component system of a dicarboxylic acid or acid derivative and an aromatic compound containing two activated hydrogen atoms, for example, 1,4-diphenoxybenzene and terephthaloyl chloride.

Electrophilic polymerization of this type is often referred to as Friedel-Crafts polymerization. Typically, such polymerizations are carried out in a reaction medium comprising the reactant(s), a catalyst, such as anhydrous aluminum trichloride, and solvent such as methylene chloride, carbon disulfide, nitromethane, nitrobenzene, or orthodichlorobenzene. Because the carbonyl groups of the reactant(s) and products complex with aluminum trichloride and thereby deactivate it, the aluminum trichloride catalyst is generally employed in an amount greater than one equivalent for each equivalent of carbonyl groups in the reaction medium. Other inorganic halides such as ferric chloride may be employed as the catalyst.

Such Friedel-Crafts polymerizations generally have produced and/or an intractable reaction product difficult to remove from the reaction vessel and purify. Further, such processes have tended to produce polymer of undesirably low molecular weight and/or of poor thermal stability. The all para-linked poly(arylene ether ketones) have been particularly difficult to prepare under such Friedel-Crafts conditions. One factor that appears to contribute to the unsatisfactory results reported in the literature is that the all-para polymers are more highly crystalline than the ortho, meta or mixed isomeric members of this polymer family and are generally more insoluble in the reaction media typically used in such Friedel-Crafts reactions. This tends to result in the premature precipitation of the polymer in low molecular weight form. Another factor that may lead to these poor results is deactivation of the terminal aryloxy groups by complexation with aluminum chloride or alkylation of the terminal group which prevents further growth of the polymer chain. Also, side reactions, particularly at the ortho position of activated aromatic rings can result in a polymer that is branched and/or is more likely to cross-link at elevated temperatures such as those required for melt processing the polymer. It is generally recognized that in Friedel-Crafts reactions, ortho substitution of the polymer is more likely to occur if the reaction is conducted at elevated temperatures for a relatively long reaction time. U.S. Pat. Nos. 3,065,205 to Bonner, U.S. Pat. No. 3,767,620 to Angelo et al, 3,516,966 to Berr, 3,791,890 to Gander et al, 4,008,203 to Jones and U.K. Pat. Nos. 971,227 and 1,086,021 both to Imperial Chemical Industries, Limited, disclose the preparation of poly(arylene ketones) by Friedel-Crafts polymerization and generally acknowledge some of the difficulties in producing tractable, melt-stable polymers. For example, Gander et al provide a method of producing the polymers in granular form by special treatment of the reaction mixture before gellation can occur and Angelo et al provide a method of treating the polymer to reduce undesired end goups which result from side reactions during polymerization and which cause thermal instability of the polymer.

To overcome the disadvantages encountered in producing poly(arylene ketones) by the above described Friedel-Crafts polymerization, it has been proposed to use boron trifluoride catalyst in anhydrous hydrogen fluoride. See for example, U.S. Pat. Nos. 3,441,538 to Marks, 3,442,857 to Thornton, 3,953,400 to Dahl, and 3,956,240 to Dahl et al. This general process has been used commercially to produce polymer of the desired high molecular weight and thermal stability. However, the use of boron trifluoride and hydrogen fluoride requires special techniques and equipment making this process difficult to practice on a commercial scale.

We have now discovered an improved process for the production of poly(arylene ketones) by an electrophilic synthesis which results in high molecular weight, thermally stable polymers using reaction media that are readily handled on a commercial scale. The process of the invention provides a high reaction rate which enables the reaction to be carried out at relatively low temperatures over a relatively short period of time. Further, the polymer is maintained in the reaction medium, for example in solution or in a reactive gel state, until high molecular weight polymer is obtained. Further, the polymer produced is essentially linear with little, if any, ortho substitution of the aromatic rings in the polymer backbone. Since the process of this invention maintains the polymer in solution or in a more tractable state, recovery and purification of the polymer is greatly facilitated.

BRIEF DESCRIPTION OF THE DRAWING

FIG. 1 is a graph illustrating the effect of the amount of Lewis acid present during the polymerization on the inherent viscosity of poly(carbonyl-p-phenylene-oxy-p-phenylene).

SUMMARY OF THE INVENTION

In accordance with the process of this invention, the Friedel-Crafts polymerization of appropriate monomer systems, as defined more fully hereinafter, is controlled to suppress side reactions including ortho substitution, alkylation and chain branching an/or to solubilize or swell the polymer, by conducting the reaction under select reaction conditions and proportions of reactants not taught or suggested by the prior art or by the addition of a controlling agent, such as a Lewis base, to the reaction medium or both.

One aspect of this invention comprises a method of producing a poly(arylene ether ketone) which comprises polymerizing (I) phosgene or an aromatic diacid dihalide together with a polynuclear aromatic comonomer containing two active hydrogen atoms or (II) a polynuclear aromatic comonomer containing both an acid halide group and an active hydrogen atom, in the presence of a Lewis acid, optionally a controlling agent and optionally a non-protic diluent, the various components being present in proportions and the polymerization being conducted under reaction conditions such that a thermally stable, linear poly(arylene ether ketone) substantially free of pendant groups resulting from ortho substitution of para-linked aromatic rings in the polymer backbone is obtained.

Another aspect of this invention comprises a method of producing poly(arylene ether ketones) which comprises polymerizing a monomer system comprising:
(I)
  (i) phosgene or an aromatic diacid dihalide together with
  (ii) a polynuclear aromatic comonomer comprising:
     (a) H—Ar—O—AR—H
     (b) H—(Ar—O)$_n$—Ar—H, wherein n is 2 or 3
     (c) H—Ar—O—A r—(CO—Ar—O—Ar)$_m$—H, wherein m is 1, 2 or 3 or
     (d) H—(Ar—O)$_n$—Ar—CO—Ar—(O—Ar)$_m$—H, wherein m is 1, 2 or 3, and n is 2 or 3 or
(II) an acid halide of the formula:

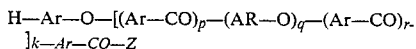

wherein Z is halogen, k is 0, 1 or 2, p is 1 or 2, q is 0,1 or 2 and r is 0, 1 or 2; or
(III) an acid halide of the formula:

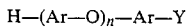

wherein n is 2 or 3 and Y is CO—Z or CO—Ar—CO—Z, where Z is halogen;
wherein each Ar is independently selected from substituted or unsubstituted phenylene, and substituted and unsubstituted polynuclear aromatic moieties free of ketone carbonyl or ether oxygen groups;
in a reaction medium comprising
(A) a Lewis acid in an amount of one equivalent per equivalent of carbonyl groups present plus one equivalent per equivalent of Lewis base, plus an amount effective to act as a catalyst for the polymerization;
(B) a Lewis base in an amount from 0 to about 4 equivalents per equivalent of acid halide groups present in the monomer system; and
(C) a non-protic diluent in an amount from 0 to about 95% by weight, based on the weight of the total reaction mixture;
with the provisos that in the substantial absence of Lewis base and:
  (i) the monomer system includes a diacid dihalide and a comonomer as defined in I(ii)(a), I(ii)(b) or I(ii)(d):
     (aa) the Lewis acid is present in excess of the minimum specified in(A) above by an amount of up to 0.8 equivalents per equivalent of undeactivated aryloxy groups in the monomers, and, if the acid halide group are situated on separate non-fused aromatic rings, by an additional amount of up to 0.5 equivalents per equivalent of acid halid groups; and
     (bb) the concentration of monomers in the reaction mixture is at least 7% by weight, based on the total weight of the reaction mixture; with the further proviso that when the monomer system includes a comonomer as defined in I(ii)(a) and the diacid dihalide is benzene dicarbonyl dichloride or diphenyl ether dicarbonyl dichloride, the polymer produced is at least partially crystalline; .
  (ii) the monomer system is III, the Lewis acid is present in excess of the minimum specified in (A) above by an amount of up to 0.8 equivalent per equivalent of undeactivated aryloxy groups in the monomers; or
  (iii) the monomer system is I(c) or II, the Lewis acid is present in an amount in excess of the minimum specified in (A) above by at least 0.6+[0.25×tanh (50(0.1-D)] equivalents per equivalent of acid halide groups where D is the molar ratio of monomer to diluent.

DETAILED DESCRIPTION OF THE INVENTION

In the electrophilic polymerization of this invention a poly(arylene ether ketone) is produced from an appropriate monomer system. The polymers produced by the process of the invention have repeat units of the general formula

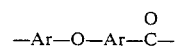

wherein each Ar is independently selected from substituted and unsubstituted phenylene and substituted and unsubstituted polynuclear aromatic moieties. The term polynuclear aromatic moieties is used to mean aromatic moieties containing at least two aromatic rings. The rings can be fused, joined by a direct bond or by a linking group. In certain of the monomers, e.g. the polynuclear aromatic comonomers, the acid halide monomers and certain diacid dihalides, at least two of the aromatic rings are linked by an ether oxygen linkage. Other linking groups which can join aromatic rings in the aromatic moieties include for example, carbonyl, sulfone, sulfide, amide, imide, azo, alkylene, perfluoroalkylene and the like.

The phenylene and polynuclear aromatic moieties can contain substitutents on the aromatic rings. These substituents should not inhibit or otherwise interfere with the polymerization reaction to any significant extent. Such substituents include, for example, phenyl, halogen, nitro, cyano, alkyl, 2-aralenyl, alkynyl and the like.

These polymers are prepared in accordance with this invention by polymerizing an appropriate monomer system. Such monomer systems comprise:

(I)
  (i) phosgene or an aromatic diacid dihalide together with
  (ii) a polynuclear aromatic comonomer selected from
    (a) H—Ar—O—Ar—H
    (b) H—(Ar—O)$_n$—Ar—H, wherein n is 2 or 3
    (c) H—Ar—O—Ar—(CO—Ar—O—Ar)$_m$—H, wherein m is 1, 2 or 3 or
    (d) H—(Ar—O)$_n$—Ar—CO—Ar—(O—Ar)$_m$—H, wherein m is 1, 2 or 3, or
(II) an acid halide of the formula:

H—Ar—O—[(Ar—CO)$_p$—(Ar—O)$_q$—(Ar—CO)$_r$—]$_k$—Ar—CO—Z wherein Z is halogen, k is 0, 1 or 2, p is 1 or 2, q is 0, 1 or 2 and r is 0, 1 or 2; or (III) an acid halide of the formula:

H—(Ar—O)$_n$—Ar—Y wherein n is 2 or 3 and Y is CO—Z or CO—Ar—CO—Z, wherein Z is halogen;

wherein each Ar is independently selected from substituted or unsubstituted phenylene, and substituted and unsubstituted polynuclear aromatic moieties free of —CO— and —O— groups.

Aromatic diacid dihalide employed is preferably a dichloride or dibromide. Illustrative diacid dihalides which can be used include, for example

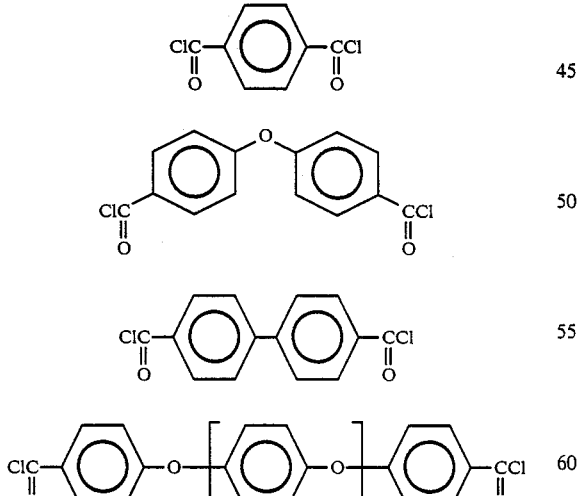

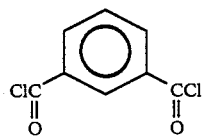

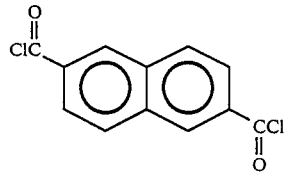

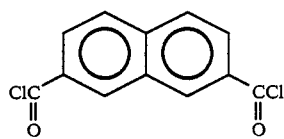

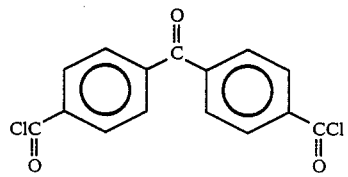

wherein a is 0-4.

Illustrated polynuclear aromatic comonomers which can be used with such diacid halides are:
(a) H—Ar—O—Ar—H, which includes, for example:

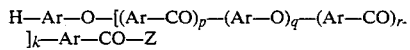

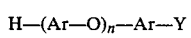

(b) H—(Ar—O)$_n$—Ar—H, which include, for example:

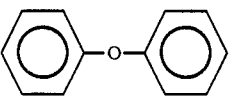

and

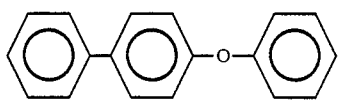

(c) H—Ar—O—Ar—(CO—Ar—O—Ar)$_m$—H, which includes, for example:

And
(d) H—(Ar—O)$_n$—Ar—CO—Ar—(O—Ar)$_m$—H which includes, for example:

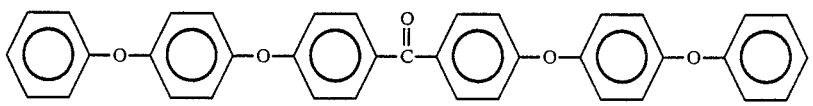

Monomer systems II and III comprise an acid halide. In monomer system II, the acid halide is of the formula

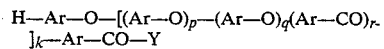

Such monomers include for example, where k=0

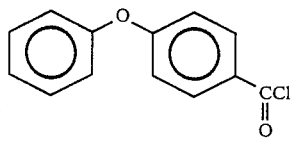

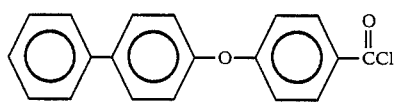

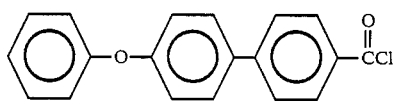

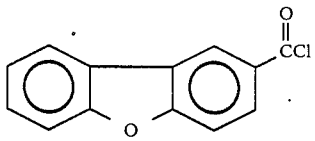

and where k=1

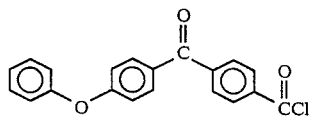

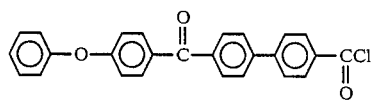

In monomer system III, the acid halide is of the formula

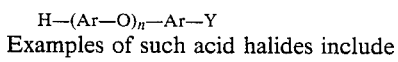

Examples of such acid halides include

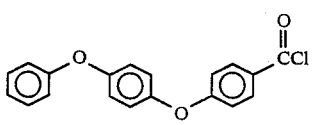

and

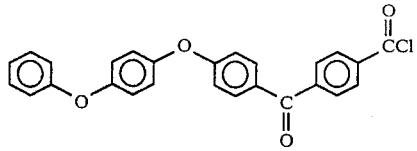

It is to be understood that combinations of monomers which fall within the same proviso clause, as set forth above, can be employed. For example one or more diacid dihalides can be used with one or more polynuclear aromatic comonomers as long as the correct stoichiometry is maintained. Further, one or more acid halides can be included. In addition monomers which do not contain an ether linkage can be employed as long as one or more comonomer used contains at least one ether oxygen linkage. Such comonomers include for example:

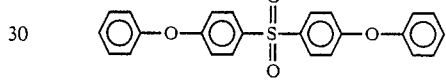

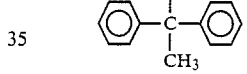

which can be used as the sole comonomer with an ether containing diacid dihalide or with phosgene or any diacid dihalide when used in addition to a polynuclear aromatic comonomer as defined in I(ii)(a), I(ii)(b), I(ii)(c) or I(ii)(d). Similarly

can be used as a comonomer together with an ether-containing polynuclear aromatic acid halide or as an additional comonomer together with a monomer system as defined in I.

The monomer system is polymerized in the presence of a reaction medium comprising:
  (A) a Lewis acid in an amount of one equivalent per equivalent of carbonyl groups present, plus one equivalent per equivalent of Lewis base, plus an amount effective to act as a catalyst for the polymerization;
  (B) a Lewis base in an amount from 0 to about 4 equivalents per equivalent of acid halide groups present in the monomer system; and
  (C) a diluent in an amount from 0 to 95% by weight, based on the weight of the total reaction mixture.

The term "Lewis acid" is used herein to refer to a substance which can accept an unshared electron pair from another molecule. Lewis acids which can be used in the practice of this invention include, for example, aluminum trichloride, aluminum tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride. The use of substantially anhydrous aluminum trichloride as the Lewis acid is preferred.

The amount of Lewis acid used in the practice of this invention varies depending on the particular monomers and reaction medium selected. In all instances at least one equivalent of Lewis acid per equivalent of carbonyl groups present in the monomer system is used plus an amount effective to act as a catalyst for the polymerization (also referred to herein as a catalytic amount). Generally a catalytic amount added is from about 0.05 to about 0.3 equivalents of Lewis acid per equivalent of acid halide in the reaction mixture. Additional amounts of Lewis acid are also required depending on the nature of the monomers and the reaction conditions in a manner as set forth below. Further, if a comonomer containing other bsic species, such as sulfone groups, is used, additional Lewis acid may be required. As indicated above, the Friedel-Crafts polymerization reaction is controlled by the addition of a controlling agent or by varying the reaction conditions, including varying the amount of Lewis acid to achieve the desried melt-processable, high molecular weight, substantially linear poly(arylene ether ketones).

In a preferred embodiment of the invention, the polymerization reaction is controlled by the addition of a controlling agent which, inter alia, suppresses undesirable side reactions, particularly ortho substitution of activated aryloxy groups. Suppression of side reactions results in a polymer that is thermally stable, that is it does not degrade or cross-link when subjected to elevated temperatures, e.g. temperatures above the melting point of the polymer, for a period of time. For a polymer of this type to be suitable for melt processing, it must be able to withstand the processing temperatures for the required processing time. Typically these conditions require that the polymer can withstand temperatures up to about 30° C. above the melting or softening point of the polymer for periods of at least 30 minutes, preferably at least 60 minutes and most preferably at least 90 minutes, without undesired gel formation or change in inherent viscosity.

Preferred controlling agents for the polymerization are Lewis bases. The term "Lewis base" is used herein to refer to a substance capable of donating an unshared electron pair to a Lewis acid. Thus, the Lewis base forms a complex with the Lewis acid used in the reaction medium. It has been found that Lewis bases which for a 1:1 complex having a heat of association greater than that of diphenyl ether with the Lewis acid are preferred. For example, where aluminum trichloride is the Lewis acid the Lewis base used should form a 1:1 complex having a heat of association of at least about 15 kcal/mole, preferably at least about 20 kcal/mole and most preferably at least about 30 kcal/mole. While the heats of association are for a 1:1 Lewis acid/Lewis base complex consiting solely of these two components, the actual complex formed need not be a 1:1 complex. The Lewis base used should not be an acylating, alkylating or arylating agent nor should it be acylatable under the reaction conditions. Mixtures of two or more Lewis bases can be used if desired. The Lewis base used as a controlling agent in the practice of this invention is an additional component added to the reaction medium. This does not include basic species formed in situ during the polymerization.

Typical Lewis bases which can be employed include, for example, amides, amines, esters, ethers, ketones, nitriles, nitro compounds, phosphines, phosphine oxides, phosphoramides, sulfides, sulfones, sulfonamides, sulfoxides, and halide salts.

Examples of specific organic Lewis bases that can be used in the practice of this invention are acetone, benzophenone, cyclohexanone, methyl acetate, ethylene carbonate, N-methylformamide, acetamide, N,N-dimethylacetamide, N-methylpyrrolidone, urea, tetramethylurea, N-acetylmorpholine, dimethyl sulfoxide, N,N-dimethylformamide, diphenyl sulfone, N,N-dimethylmethanesulfonamide, phosphoryl chloride, phenylphosphonyl chloride, pyridine-N-oxide, triphenylphosphine oxide, trioctylphosphine oxide, nitropropane, nitrobenzene, benzonitrile, n-butyronitrile, methyl ether, tetrahydrofuran, dimethyl sulfide, trimethylamine, N, N, N', N'-tetramethylethylenediamine, N,N-dimethyldodecylamine, imidazole, pyridine, quinoline, isoquinoline, benzimidazole, 2,2'-bipyridine, o-phenanthroline, 4-dimethylaminopyridine, and the like. In addition to covalent organic compounds, suitable Lewis bases include inorganic salts which can form complexes with Lewis acids, for example, chlorides, such as trimethylammonium chloride, tetramethylammonium chloride, sodium chloride or lithium chloride, perchlorates, trifluoromethanesulfonates and the like.

Preferred Lewis bases for the reaction medium of this invention are N-methylformamide, N,N-dimethylformamide, N,N-dimethylacetamide, 1-methyl-2-pyrrolidone, tetramethylene sulfone (also known as sulfolane), n-butyronitrile, dimethyl sulfide, imidazole, actone, benzophenone, trimethylamine, trimethylamine hydrochloride, tetramethylammonium chloride, pridine-N-oxide, 1-ethylpyridinium chloride, lithium chloride, lithium bromide, sodium chloride, sodium bromide, potassium chloride, potassium bromide and mixtures thereof.

The amount of Lewis base present should be from 0 to about 4 equivalents per equivalent of acid halide groups present in the monomer system. Amounts greater than 4 equivalents could be employed, if desired. However, no additional controlling effect is usually achieved by adding larger amounts. Thus, it is preferred to use no more than about 4 equivalents and generally about 2 equivalents. When a Lewis base is added to control the reaction at least about 0.01, preferably about 0.05 and most preferably about 0.5 equivalents of Lewis base per equivalent of acid halide groups present should be used. The particular amount of Lewis base added depends to a certain extent on the nature of the monomers present. When a Lewis base is used to control the reaction the temperature at which the reaction is conducted can be from about −50° C. to about +150° C. It is preferred to start the reaction at lower temperatures, for example at about −50° to about −10° C. particularly if the monomer system contains particularly reactive monomers. After polymerization has commenced the temperature can be raised if desired, for example, to increase the rate of reaction. It is generally preferred to carry out the reaction at temperatures in the range of between about −30° C. and +25° C. (room temperature).

While it is not understood exactly how the Lewis base acts to control the reaction, it is believed that one or more of the following factors may be invloved. The Lewis acid/Lewis base complex appears to act as a solvent for the polymer-Lewis acid complex formed during the reaction, thereby maintaining the polymer in solution or a reactive gel state. Further, the reaction mixture is more tractable, making work up of the polymer easier and ensuring effective removal of catalyst residues during purification. The solubilization property of the Lewis acid/Lewis base complex is particularly significant in the preparation of all para-linked poly(arylene ether ketones). As mentioned above these polymers are more highly crystalline than other members of this polymer family and their complexes with the Lewis acid tend to precipitate from the reaction medium in low molecular weight form and/or in a particularly intractable mass extremely difficult to recover and purify. When such polymers are made in accordance with this embodiment of the invention, it is advantageous to select a Lewis acid and Lewis base combination which form a complex which, in addition to the above specified characteristics, also dissolve the desired polymer. This can easily be determined by preparing a complex, optionally adding a diluent, and then adding the polymer to see if it dissolves.

If a diluent such as methylene chloride or dichloroethane is used, that the Lewis acid/Lewis base complex reduces the tendency of these diluents to act as an alkylating agent by competing with the diluent for available Lewis acid and thereby suppresses alkylation of the polymer. Alkylation of the polymer in the para position caps the reaction while alkylation in the ortho position introduces undesired reactive cites in the polymer chain which can lead to branching or cross linking.

It is believed that the aromatic rings which are particularly susceptible to ortho substitution are active aryloxy groups. Such groups are referred to herein as undeactivated aryloxy groups. By "undeactivated aryloxy group" is meant an aryloxy group which is in a molecule in which there are no deactivating groups or is located at least two aromatic moieties (i.e. Ar as defined above) away from a deactivating group such as a carbonyl. Conversely a "deactivated aryloxy group" is an aryloxy group separated from a deactivating group, usually carbonyl, by an aromatic group containing one aromatic ring, fused aromatic rings or aromatic rings liked by direct bonds.

A diluent can also be employed, if desired. Advantageously, the diluent should dissolve the Lewis acid/Lewis base complex and the resulting polymer/Lewis acid complex but this is not an essential requirement of the diluent. It should also be relatively inert toward Friedel-Crafts reactions. The diluent is preferably somewhat polar as measured by its dielectric constant and solubility parameter. Preferably the dielectric constant of the diluent is at least about 2.5 at 24° C., and preferably in the range of from about 4.0 to about 25° at 24° C. The Hildebrand solubility parameter of the diluent is preferably at least about 7.2 [cal/cm$^3$]$^{\frac{1}{2}}$ and is preferably in the range of from about 9.2 to about 15 [cal/cm$^3$]$^{\frac{1}{2}}$. Preferred diluents include, for example, methylene chloride, carbon disulfide, o-dichlorobenzene, 1,2,4-trichlorobenzene, o-difluorobenzene, 1,2-dichloroethane, 1,2,3,4-tetrachloroethane and tetrachloroethylene.

The diluent is used in an amount from 0 to about 95% by weight, based on the weight of the total reaction mixture. As is known in polymerizations of this type, the reactions can be run neat, that is without the presence of a diluent. This is true for the process of this invention whether or not a Lewis base is used. As discussed in more detail below, it has been found that the monomer to diluent ratio can contribute to control of the polymerization reaction to yield the desired product.

Use of an alkylating or acylating diluent can lead to undesired side reactions as mentioned above. When such solvents are employed control of the polymerization by techniques taught in this specification suppresses such alkylation or arylation. The result is a thermally stable, melt processable, essentially linear polymer.

The polymerization reaction can also be moderated by use of the appropriate reaction conditions without the addition of a Lewis base. The reaction conditions required depend on the reactivity of the monomers used. Two general classes of monomers need to be considered—those containing undeactivated aryloxy groups as defined above and those which do not. If any monomer in the monomer system contains an undeactivated aryloxy group, the amount of Lewis acid used generally must not exceed a certain amount.

Monomer systems which can be used in the practice of this invention have been defined above with consideration of the reactivity of the aryloxy groups present. The conditions under which the polymerization will be moderated to produce the desired product can then be set forth with further requirements indicated where the relative activity of the acid halide groups make this necessary.

Briefly, the monomer systems are:

(I)
  (i) phosgene or an aromatic diacid dihalide together with
  (ii) a polynuclear aromatic comonomer comprising:
    (a) H—Ar—O—Ar—H
    (b) H—(Ar—O)$_n$—Ar—H, wherein n is 2 or 3
    (c) H—Ar—O—Ar—(CO—Ar—O—Ar)$_m$—H, wherein m is 1, 2 or 3 or
    (d) H—(Ar—O)$_n$—Ar—CO—Ar—(O—Ar)$_m$—H, wherein m is 1, 2 or 3, and n is 2 or 3 or (II) an acid halide of the formula:

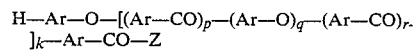

wherein Z is halogen, k is 0, 1 or p is 1 or 2, q is 01 or 2 and r is 0, 1 or 2; or (III) an acid halide of the fomula:

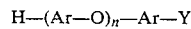

wherein n is 2 or 3 and Y CO—Z or CO—Ar—CO—Z, wherein Z is halogen;
wherein each Ar is independently selected from substituted or unsubstituted phenylene, and substituted and unsubstituted polynuclear aromatic moieties free of ketone carbonyl and ether oxygen groups.

Monomer systems that contain undeactivated aryloxy groups are I wherein the comonomer is as defined in I(ii)(a), I(ii)(b), I(ii)(d) and III. In general, when monomers of this type are used the amount of Lewis acid present in addition to the above noted one equivalent per equivalent of carbonyl groups present plus an amount effective to act as a catalyst for the polymerization, should be less than 0.8 equivalents per equivalent of undeactivated aryloxy groups. Preferably even less than that should be used, for example less than about 0.6 equivalents and most preferably less than about 0.4 equivalents per equivalent of undeactivated aryloxy groups present. However, because of the reactivity of certain polynuclear diacid dihalides such as diphenyl ether dicarbonyl dichloride, it has been found desirable to employ a different amount of Lewis acid when such diacid dihalides are used in the monomer system. When such polynuclear diacid dihalides are used in monomer system I with a comonomer defined in I(ii)(a), I(ii)(b) and I(II)(d) it is often desirable to add further Lewis acid up to 0.5 equivalents per equivalent of acid halide groups. Preferably the further amount added is between about 0.03 and 0.5 equivalents per equivalent of acid halide groups. We have found that meta-benzene dicarbonyl dichloride is sufficiently reactive and the product sufficiently soluble in the reaction medium that it is not necessary to limit the maximum excess of Lewis acid to obtain high molecular weight polymer. However, to prepare polymers which are at least partly crystalline from monomer systems including substantial amounts of the less reactive para benzene dicarbonyl dichlorides, it is very beneficial to use an amount of Lewis acid in excess of that defined in (A) above by an amount of up to 0.8 equivalents per equivalent of undeactivated aryloxy groups in the monomers.

It has also been found to be necessary when the monomer system used is I with the comonomer being that defined in I(ii)(a), I(ii)(b) or I(ii)(d) that the concentration of monomers in the reaction mixture be at least about 7%, preferably at least about 10%, and most preferably at least about 15%, by weight based on the total weight of the reaction mixture.

When the monomer system employed is III, it is also desirable to conduct the reaction at similar monomer concentrations.

The second general class of monomers are monomer systems which contain no undeactivated aryloxy groups. Monomers of this type are set forth in monomer system I wherein the comonomer is as defined in I(ii)(c) and II. With this class of polymers it is preferred to use a large excess of Lewis acid, the excess depending on the particular monomer to diluent molar ratio (D). Generally, it is preferred to have a relatively high monomer to diluent ratio and a relatively large excess of Lewis acid. The amount of excess Lewis acid (in addition to the above noted equivalent per equivalent of carbonyl groups plus a catalytic amount) is at least about $0.6+(0.25\times\tanh[50(0.1)])$ equivalents per equivalent of acid halide groups. The amount of excess Lewis acid is preferbly at lest $0.8+(0.25\times\tanh[50(0.1\text{-D})])$ and most preferably is at least $1.0+(0.25\times\tanh[50(0.1\text{-D})])$ equivalents per equivalent of acid halide groups. When the monomer to diluent ratio is greater than about 0.15, the amount of Lewis acid in excess of the standard amount is at least about 0.3 equivalents per equivalent of acid halide groups.

In general, it is preferred to add Lewis acid in a substantial excess of the minimum amounts specified. Generally, at least 0.5 equivalent and preferably at least about 1.0 equivalents of additional Lewis acid, per equivalent of acid halide groups are used.

The reaction conditions found to be necessary to prepare melt-processable, high molecular weight, substantially linear poly(arylene ether ketones) are not taught or suggested by the prior art and in fact are contrary to the generally held beliefs of Friedel-Crafts chemistry. Conventionally, a moderate excess of Lewis acid usually about 0.4 equivalents per equivalent of carbonyl groups in the monomer system is used in Friedel-Crafts reactions. Applicant has found that when all aryloxy groups present the monomer system are deactivatied by arloxy groups as defined above, a large excess of Lewis acid must be used. this is illustrated in FIG. 1, where the relationship between the amount of Lewis acid used and the molecular weight of the polymer as measured by inherent viscosity as described below. Prior ar Friedel-Crafts polymerization reactions of this type were conducted using proportions of Lewis acid on the steep part of the curve, well below that needed for the production of polymer whose molecular weight does not depend on the Lewis acid/monomer ratio or used monomer to diluent molar ratios below that required. Where there are undeactivated aryloxy groups present in the monomer system, it has been found to be necessary to add a smaller excess of Lewis acid than taught in the prior art but to maintain a relatively high monomer concentration in the reaction mixture. As mentioned above, this results in suppression of side reactions, particularly in the ortho position of para-linked aromatic rings in the polymer chain. Traditional Friedel-Crafts chemistry suggests the use of a moderate excess of Lewis acid and a more dilute reaction mixture to achieve these results. Applicants have found the opposite to be necessary in the preparation of poly(arlene ether ketones).

As mentioned above, one of the important features of this invention is that poly(arlene ketones) of high molecular weight can be obtained. By "high molecular weight" is meant polymer having an inherent viscosity greater than 0.6. Preferably the polymer prepared by the process of this invention has an inherent viscosity in the range of about 0.6 to about 2.0. Polymers having an inherent viscosity below about 0.6 are generally not useful because they have poor mechanical properties, such as tensile strength and elongation. They also tend to be brittle while polymers having an inherent viscosity above about 2.0 are very difficult to melt process. Throughout this application, inherent viscosity refers to the mean inherent viscosity determined according to the method of Sorenson et al, "Preparative Methods of Polymer Chemistry" Interscience (1968), at page 44 [0.1 g polymer dissolved in 100 ml of concentrated sulfuric acid at 25° C.].

If desired, the molecular weight of the polymer, the degree of branching and amount of gelation can be controlled by the use of, for example, capping agents as described in U.S. Pat. No. 4,247,682 to Dahl, the disclosure of which is incorporated herein by reference. The molecular weight of the polymer can also be controlled by a polymerization reaction utilizing a two-monomer system as described above, by employing a slight excess of one of the monomers.

Capping agents, when employed, are added to the polymerization reaction medium to cap the polymer on at least one end of the polymer chain. This terminates continued growth of that chain and controls the resulting molecular weight of the polymer, as shown by the inherent viscosity of the polymer. Judicious use of the capping agents results in a polymer within a selected narrow molecular weight range, decreased gel formation during polymerization, and decreased branching of the polymer chains and melt stability. Both nucleophilic and electrophilic capping agents are used to cap the polymer at each end of the chain.

Preferred nucleophilic capping agents are 4-chlorobiphenyl, 4-phenoxybenzophenone, 4-(4-phenoxyphenoxy)benzophenone, biphenyl 4-benzenesulfonylphenyl phenyl ether, and the like.

Typical electrophilic capping agents are compounds of the formula

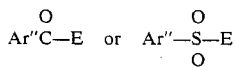

wherein Ar" is phenyl, 3-chlorophenyl, 4-chlorophenyl, 4-cyanophenyl, 4-methylphenyl or other aromatic group substituted with an electron withdrawing substituent and E is halogen or other leaving group. Preferred electrophilic capping agents include benzoyl chloride, benzenesulfonyl chloride and the like.

As mentioned above, a key aspect of this invention is that the Lewis and/Lewis base complex solubilizes or solvates the polymer so that it remains in the reaction medium in a form capable of sustaining continued polymerization so that the desired high molecular weight is obtained in a controlled and reproducible fashion. Lewis acid is also present in the reaction medium as the catalyst for the Friedel-Crafts polymerization reaction. The resulting polymer contains Lewis acid complexed to the carbonyl groups of the polymer. For many polymerizations, the Lewis acid is complexed to substantially all the carbonyl groups in the polymer. As is well known with polymers of this type, the catalyst residue must be removed, i.e. the Lewis acid must be decomplexed from the polymer and removed. A method for removing the catalyst residue is described in U.S. Pat. No. 4,237,884 to Dahl, the disclosure of which is incorporated herein by reference.

Decomplexation can be accomplished by treating the polymerization reaction mixture with a decomplexing base after completion of polymerization. The base can be added to the reaction medium or the reaction medium can be added to the base. The decomplexing base must be at least as basic towards the Lewis acid as the basic groups on the polymer chain. such decomplexation should be effected before isolation of the polymer from the reaction mixture.

The amount of decomplexing base used should be in excess of the total amount of bound (complexed) and unbound Lewis acid present in the reaction mixture and is preferably twice the total amount of Lewis acid. Typical decomplexing bases which can be used include water, dilute aqueous hydrochloric acid, methanol, ethanol, acetone, N,N-dimethylformamide, N,N-diemethylacetamide, pyridine, dimethyl ether, diethyl ether, tetrahydrofuran, trimethylamine, trimathylamine hydrochloride, dimetyl sulfide, tetramethylanesulfone, benzophenone, tetramethylammonium chloride, isopropanol and the like. The decomplexed polymer can then be removed by conventional techniques such as adding a nonsolvent for the polymer which is a solvent for or miscible with the rest of the reaction mixture including the base-catalyst complex; spraying the reaction medium into a non-solvent for the polymer; separating the polymer by filtration; or evaporating the volatiles from the raction medium and then washing with an appropriate solvent to remove any remaining base/catalyst complex from the polymer.

In recovery of the polymer from the reaction mixture, the reaction mixture can be liquified, if desired by the method described in U.S. Pat. No. 4,6556151 (1987) of R. Reamey, the disclosure of which is incorporated herein by reference.

The following examples illustrate the process of this invention using a variety of Lewis acids, Lewis bases, inert diluents and monomers. It is to be understood that other reactants and reaction media within the scope of the teaching of this invention can be employed, if desired.

EXAMPLE 1

A 500 ml 3 neck round bottom flask equipped with a stirrer, thermometer, and nitrogan inlet was charged with 1,4-diphenoxybenzene (13.2198 g 0.0504 mole), terepthtaloyl chloride (10.1515 g 0.0500 mole), benzoyl chloride (0.1124 g, 0.0008 mole)., sulfolane (27.04 g, 0.225 mole), and anhydrous methylene chloride (150 millimeters, ml). The atmosphere inside the flask was purged with and kept under nitrogen. The flask and its contents were cooled to $-40°$ C. with a dry ice-acetone bath. Anhydrous aluminum chloride (49.7 g, 0.373 mole) was added over a 12 minute period, with continued cooling. The stirred reaction mixture was allowed to warm up to about 15° C. over a period of 1.5-2 hours. The red, highly viscous mixture was then transferred to a glass tray under nitrogen, allowed to warm up to 20° C., and added portionwise to rapidly stirred methanol (Waring blender). The resulting fibrous polymer was collected, washed with methanol, and soaked over night in more methanol. Following a second overnight soaking, this time in water, another methanol wash, and vacuum drying (120°-160° C.), there was obtained a colorless fibrous polymer (18.9 g, 96.3% yield).

Its inherent viscosity was 1.09 (0.1% solution in sulfuric acid). Compression molding at 400° C. for 3 min gave nearly colorless flexible slabs of essentially unchanged inherent viscosity (1.10). Stress/strain analysis of the slabs gave a Young's modulus of 216,700 psi, elongation at break of 80%, and tensile strength of 9,130 psi, as measured by ASTM D-638-80. Material extruded at 400° C. also exhibited no change in inherent viscosity (1.10).

EXAMPLE 2

To a 250 ml three neck round bottom flask equipped with a mechanical stirrer, a nitrogen inlet, and a thermometer well fitted with a J-type thermocouple was added methylene chloride (30 ml, freshly distilled from phosphorus pentoxide). The flask and its contents were purged with and kept under nitrogen and cooled to $-27°$ C. with a dry ice-acetone bath. Anhydrous aluminum chloride (17.68 g, 132.6 mmole) was then added via Gooch tubing. To the resulting cold solution, N,N-dimethylformamide (DMF, 5.54 g, 75.8 mmole, freshly vacuum distilled from calcium hydride) in methylene chloride (15 ml) was added slowly (to control the vigorous exotherm). With continued cooling, a solution of 1,4-diphenoxybenzene (6.6811 g, 25.5 mmole), terephthaloyl chloride (5.1302 g, 25.3 mmole), and benzoyl chloride (0.571 g, 0.40 mmole) in methylene chloride (25 ml) was added. The transferring flask was rinsed with an additional volume of methylene chloride (10 ml) to ensure complete transfer. The stirred reaction mixture was allowed to warm up to room temperature over a 6.3 hour period, during which time it became a viscous orange-red suspension. It was next cooled down to 5°-6° C. with an ice bath and the reaction was quenched with DMF (50 ml). At this time, the polymerization mixture became a highly viscous white slurry.

The polymer was isolated by filtration, transferred into a 1 qt. glass blender containing cold (0° C.) DMF (100 ml), and blended at high speed until room temperature was reached. This process was repeated. The polymer was then digested twice in DMF (250 ml, 50° C., 24 hrs), once in water (300 ml, room temperature, 24 hours), and once in hydrochloric acid (0.5 M, 500 ml, room temperature, 24 hours). After washing with more water and vacuum drying, polymer (8.9g, 90% yield) of inherent viscosity 1.2 (0.1% in sulfuric acid) was obtained. Its melt stability and processability were demonstrated by the fact that slabs pressed for 30 min at 400° C. showed minimal change in inherent viscosity.

EXAMPLE 3

The procedure of Example 2 was repeated using terephthaloyl chloride (5.17 g, 25.2 mmole), 1,4-diphenoxybenzene (6.56 g. 25.0 mmole) and 4-(4-phenoxyphenoxy)benzophenone (0.1466 g, 0.4 mmole).

The resultant polymer had an inherent viscosity of 1.25. Polymer pressed for 30 minutes at 400° C. gave slabs of inherent viscosity 1.34 (average of 2 samples). Pressing at 410° C. for 30 minutes gave slabs of inherent viscosity 1.71 (average of 3 samples), with a slight amount of gel.

EXAMPLE 4

The procedure of Example 2 was repeated using purified aluminum chloride. The initial temperature employed was −15° C. and the reaction mixture was allowed to warm up to 8° C. The aluminum chloride was purified prior to introduction into the reaction medium by vacuum distillation from a mixture of 1500 g aluminum chloride, 100 g sodium chloride and 5 g aluminum powder followed by vacuum sublimation.

The polymer thus obtained had an inherent viscosity of 1.17 (average of 2 samples). Slabs pressed at 400 ° or 410° C. for 30 minutes had inherent viscosities of 1.15 (average of 4 samples) and 1.18 (average of 4 samples), respectively. No gel was observed in any of the slabs.

EXAMPLE 5

A reaction flask equipped with a magnetic stirrer and purged with nitrogen and charged with methylene chloride (8 ml) was cooled in an ice bath. To it was added n-butyronitrile (1.382 g, 0.020 mmole) followed by aluminum chloride (6.56 g, 0.050 mmole). The latter was added slowly because of the vigorous exotherm generated. When this addition was completed, p-phenoxybenzoyl chloride (2.33 g, 0.010 mmole) was added, also gradually. Polymerization was allowed to proceed overnight (about 16 hours) at room temperature. The polymer was recovered by transferring the polymerization mixture into methanol (about 100 ml), breaking it up in a blender at high speed, filtering, and washing generously with methanol. After digesting overnight in more methanol (about 100 ml) at room temperature, the polymer was washed with water and vacuum dried (120°-160° C.). The product was a white polymer of inherent viscosity 1.69. When compression molded at 400° C. for 3 min, it formed a transparent yellow, tough, flexible slab.

EXAMPLE 6

Example 5 was repeated, but with the Lewis bases (0.020 mmole) given in Table I in place of the n-butyronitrile.

TABLE I

| Lewis Base | Color | Inherent Viscosity | Slab (3 min, 400° C.) |
|---|---|---|---|
| Dimethyl sulfide | White | 0.79 | Tough, flexible, yellow |
| 1-Nitropropane | White | 0.57 | Tough, flexible, l. tan |
| Pyridine N-oxide | L. pink | 2.5** | Tough, flexible, l. tan |
| Isoquinoline | L. pink | 0.84 | Tough, flexible, l. tan |
| Methylamine hydrochloride | White | 0.40 | Brittle, l. tan |
| 1-Ethylpyridinium bromide | L. pink | 2.50** | Tough, flexible, l. pink |
| Triphenyl phosphine oxide | L. pink | 0.50 (some*** gel) | Flexible, l. tan |
| *Diethylamine hydrochloride | — | 0.77 | Tough, flexible |
| *Diethyl ether | — | 0.80 | Tough, flexible |
| *Imidazole | — | 1.79 | Tough, flexible |
| Acetone | White | 0.73 | Tough, flexible |
| Methyl Acetate | White | (some gel)*** | Tough, flexible |
| N,N-Dimethylformamide | White | 1.82 | Tough, flexible |
| Tetramethylammonium chloride | White | 0.82 | Tough, flexible |

*Run on the scale corresponding to 0.006 mmole p-phenoxybenzoyl chloride.
**The high inherent viscosity indicates production of high molecular weight polymer. Use of capping agents so described above would yield a polymer in the desired molecular weight range.
***The presence of gel indicates cross-linking has occurred. The inherent viscosity measurement reflects the molecular weight of the uncross-linked portion of the polymer product.

EXAMPLE 7

Example 5 was repeated, except that o-dichlorobenzene was used in place of the methylene chloride. The resultant polymer was light yellow and had an inherent viscosity of 1.12. It could be pressed at 400° C. into a tough, flexible, pale yellow slab.

EXAMPLE 8

Example 5 was repeated, except that DMF was substituted for n-butyronitrile and o-difluorobenzene for methylene chloride. The resultant polymer was light yellow and had an inerent viscosity of 1.18. It could be pressed into a tough, flexible, pale yellow slab.

EXAMPLE 9

Example 5 was repeated, except that DMF was substituted for n-butyronitrile and 1,2,4-trichlorobenzene for methylene chloride. The resultant polymer was white and had an inherent viscosity of 1.50. It could be pressed into a flexible, light colored slab.

EXAMPLE 10

Diphenyl ether (1.7025 g, 0.010 mole) was polymerized with terephthaloyl chloride (1.6242 g, 0.008 mole) and isophthaloyl chloride (0.04058 g, 0.002 mole) in the presence of methylene chloride (14 ml), trimethylamine hydrochloride (2.19 g, 0.023 mole), and aluminum chloride (6.0 g, 0.045 mole) by the procedure described in example 5. The resultant polymer had an inherent viscosity of 0.74. It could be pressed into a slab that was light colored and flexible.

EXAMPLE 11

The N-succinimido derivative of p-phenoxybenzoic acid (1.200 g, 0.004 mole) was polymerized in methylene chloride (6 ml), trimethylamine hydrochloride (1.50 g, 0.016 mole), and aluminum chloride (4.40 g, 0.033 mole) according to the procedure in example 5.

The resulting polymer had an inherent viscosity of 0.95 and could be pressed into a flexible tan slab.

EXAMPLE 12

A suspension of lithium chloride (0.84 g, 0.0198 mole) and aluminum chloride (5.40 g, 0.0405 mole) in 1,2-dichloroethane (7.0 ml) was stirred under nitrogen in a sealed reaction tube for 40 minutes. To the resulting solution was added p-phenoxybenzoyl chloride (2.20 g, 0.00945 mole). Polymerization was permitted to continue for about 90 minutes to yield a highly viscous solution. 1,2-dichloroethane (4 ml) was added to dilute the reaction mass. The polymer was recovered by decomplexation of the mixture with water in a Waring blender, washing with a water/methanol solution, soaking the product in water overnight, then washing with methanol and drying. The product was a colorless polymer having an inherent viscosity of 1.58. When compression molded at 400° C. for 2 minutes, it formed a pale yellow, tough, flexible slab.

EXAMPLE 13

A 500 ml 3-neck round bottom flask equipped with a stirrer, thermometer and nitrogen inlet was charged with N,N-dimethylformamide (16.45g, 0.2250 mole) and anhydrous methylene chloride (150 ml). The atmosphere inside the flask was purged with and kept under nitrogen. The flask and its contents were cooled to −30° C. with a dry ice-acetone bath. Anhydrous aluminum chloride (75.30 g, 0.5647 mole), followed by 4,4'-diphenoxybenzophenone (18.3940 g, 0.05020 mole), terephthaloyl chloride (10.1510 g, 0.0500 mole) and benzoyl chloride (0.0493 g, 0.3500 mmole) were added with continued cooling. The transferring flasks were rinsed with anhydrous methylene chloride (50 ml total) to ensure complete transfer. The stirred reaction mixture was allowed to warm up to 0° C. in 15 minutes and to 21° C. in 1.5 hours. Part of the viscous reaction mixture was added portionwise to rapidly stirred methanol (Waring blender). The resulting fibrous polymer was collected, washed with methanol and vacuum dried (120°–160° C.). Its inherent viscosity was 1.28 (0.1% in sulfuric acid). The remaining part of the viscous reaction mixture was added portionwise to rapidly stirred 10% hydrochloric acid (Waring blender). The fibrous polymer obtained was washed with water, then refluxed 15 minutes in N,N-dimethylacetamide, washed with water and vacuum dried (120°–160° C.). Its inherent viscosity was 1.37. A compression molded slab pressed at 400° C. for 20 minutes showed an inherent viscosity of 1.40, indicating melt stability. Its processability was further demonstrated by extrusion at 400° C. through a mini-extruder to give a light tan, flexible and smooth strand of extrudate of 1.42 inherent viscosity.

EXAMPLE 14

A 50 ml 3 neck round bottom flask equipped with a stirrer, thermometer and nitrogen inlet was charged with aluminum trichloride (6.29 g, 0.0472 mole) and lithium chloride (1.00 g, 0.0236 mole) in 1,2-dichloroethane (17 ml) was cooled to 0° C. in an ice-acetone bath. Diphenyl ether (2.01 g, 0.0118 mole) and phosgene (2.80 g, 0.0283 mole) were then added. The bath was removed and the reaction mixture was permitted to warm to room temperature (24° C.). The mixture was stirred at 24° C. for 23 hours. A clear deep red viscous mass formed. Additional diphenyl ether (0.060 g 6×10⁻⁴ mole) was then added and the reaction mixture stirred for 2 hours. The reaction mass was added to cold methanol (Waring blender), filtered and the precipitate was washed in methanol overnight then soaked in water. The mixture was filtered, rinsed with methanol and dried under vacuum at 120° C. The resulting polymer (2.15 g, 92% yield) was an off-white powder having an inherent viscosity of 0.60 (0.1% in concentrated sulfuric acid).

Compression molding at 400° C. yielded a light colored, tough, flexible slab. The slab became brittle on annealing.

EXAMPLE 15

The procedure of Example 15 was repeated using 4,4'-diphenoxybenzophenone (2.162 g, 0.0059 mole), phosgene (1.43 g, 0.0144 mole), lithium chloride (1.00 g, 0.0236 mole) and aluminum trichloride (6.24 g, 0.0468 mole) in 1,2-dichloroethane (8 ml). The resulting product (2.2 g, 94% yield) was an off-white polymer having a relatively high gel content which formed a yellow flexible slab when pressed at 400° C.

The preparation of aromatic polymers in accordance with this invention has been set forth above with reference to specific embodiments thereof. It is to be understood that the specific embodiments are illustrative in nature and the invention is not limited to such embodiments. The invention in its broadest aspect is directed to an electrophilic polymerization reaction in which the reaction medium comprises free Lewis acid and a complex between a Lewis acid component and a Lewis base component and, optionally, a diluent.

EXAMPLE 16

Procedure A: N,N-Dimethylformamide (DMF, 1.45 g, 0.020 mole) was added dropwise with cooling and stirring to anhydrous aluminum chloride (5.70 g, 0.043 mole). An exotherm ensued, leading to a hot, fluid melt with a few suspended aluminum chloride particles. The fluid was kept at 100°–110° C. for 5–10 minutes under nitrogen. Upon cooling, a light colored liquid was obtained, apparently containing some still undissolved aluminum chloride. p-Phenoxybenzoyl chloride (3.00 g, 0.013 mole) was added with stirring. The entire mixture was heated according to the schedule in the accompanying table, cooled, and worked up by precipitating into methanol, washing with water and methanol, and drying.

Procedure B: The reaction was carried out as above, but with the following amounts of chemicals: DMF (1.46 g, 0.02 mole), anhydrous aluminum chloride (5.32 g, 0.040 mole), and p-phenoxybenzoyl chloride (1.60 g, 0.007 mole). The polymerization mixture was not heated, but was instead maintained at room temperature for the times indicated.

Results are given in the table below. Inherent viscosities reported are those of the polymer as obtained, and not of the slabs. Slabs, if noted, were pressed at 400° C. for 3 minutes.

TABLE II

| Procedure | Time/Temp. Profile | Inh. Visc. | Comments |
|---|---|---|---|
| B | 62 hr/24° C. | 1.46 | Flexible yellow-red slab |
| B | 17 hr/24° C. | 0.57 | Light colored polymer |
| A | 15 min/24° C. and 10 min/100–20° C. | 1.14 | Pale yellow polymer; light colored, flexible slab |
| A | 1 hr/24° C. and 15 min/100° C. | 0.86 | Colorless crystalline slab |
| A | 5 min/24° C., | 0.73 | Light tan flexible slab |

TABLE II-continued

| Pro-cedure | Time/Temp. Profile | Inh. Visc. | Comments |
|---|---|---|---|
| | 5 min/80-100° C., 5 min/150-70° C., and 2 min/170-80° C. | | |

EXAMPLE 17

A stock solution was prepared from p-phenoxybenzophenone (0.6165 g, 0.00225 mole), benzoyl chloride (0.3032 g, 0.00215 moles), dichlorethane (63.6 g), and p-phenoxybenzoyl chloride (116.2 g, 0.400 mole) and stored at room temperature in a flask stoppered with an-air/no-air septum. This stock solution was sufficient for about twenty polymerizations of the scale below. Polymer prepared from this stock solution is double-capped at 0.6 mole % (calculated from the ratio of p-phenoxybenzophenone, the limiting capping agent, to p-phenoxybenzoyl chloride).

A reactor consisting of 200 ml resin kettle and a top with four openings to which were attached a mechanical stirrer with a PTFE paddle, a 50 ml addition funnel, a glass-clad thermocouple probe and an inert gas supply tube was assembled. (Glass equipment was dried at 100° C. until just prior to use.) All ground glass joints were sealed with PTFE seals, except for the stirrer shaft which was sealed with vacuum grease. The assembled reactor was dried with a hot air fun or Bunsen burner while being flushed with nitrogen or argon. The inert gas atomsphere was maintained throughout the operations except for momentary interruptions for the addition of reagents.

The reactor was charged with, in order, anhydrous aluminum chloride (10.0 g, 0.075 mole, Witco #0099), lithium chloride (1.59 g, 0.0375 mole, ACS Reagent Grade), and 1,2-dichloroethane (10.0 g). The white slurry was cooled to between 015° and −25° C. with a dry ice/acetone bath.

Monomer stock solution (9.04 g) was added dropwise over a 7 min, with continued stirring and cooling. After the completion of this addition, the reaction mixture's temperature was maintained at −15° C. for one hour and then raised to 0° C. and maintained there for 23 hours. Approximately 2-3 hours after addition of the monomers, a notable increase in viscosity occurred. At this point stirring became extremely difficult and was usually discontinued.

The polymer could be isolated by one or two workup procedures:

(A) The reaction mixture was transferred into a 500 ml Waring blender containing DMF (100-200 ml) chilled to −40° C. The blender was turned on and the dark orange gel transformed into a white, decomplexed polymer. The polymer was collected by filtration, washed with DMF (100 ml), digested in DMF (100 ml, 50° C., overnight), filtered, and digested in water (2×150 ml, 60° C., 1 hr each). After filtration, the polymer was dried overnight at 165° C. in a vacuum oven.

(B) The reaction mixture was transferred into a 500 ml Waring blender containing 2% aqueous hydrochloric acid (200 ml) at room temperature. The blender was turned on and the dark orange gel transformed into white, decomplexed polymer. The polymer was collected by filtration, washed with 2% aqueous hydrochloric acid (200 ml) and digested successively in methanol (200 ml, overnight, 40° C.) and in hot 2% aqueous hydrochloric acid (2×200 ml, 1 hr each). After filtration, the polymer was washed with deionized water (500 ml) and dried overnight at 165° C. in a vacuum oven.

A white fluffy polymer with inherent viscosity 1.1-1.2 dl/g was obtained. The inherent viscosity did not change by more than 0.10 dl/g after 30 min at 400° C.

EXAMPLE 18

This example demonstrates the suppression of undesirable side reactions by polymerization in the presence of a Lewis base (in this case, lithium chloride). Two polymerizations were performed, employing the procedure of Example 17, workup B, with the following exceptions: (1) the capping level was 0.45 mole %, (2) the time-temperature profile was 1 hr/0° C. followed by room temperature reaction, and (3) one of the reactions was run without lithium chloride. Aliquots were taken out at the times indicated in the accompanying table and figure, worked up, and analyzed.

While the reaction with lithium chloride responds as expected to capping and achieves stable molecular weight after about fifteen hours, the one without lithium chloride does not respond to capping, but instead keeps increasing in molecular weight, indicating the occurrence of substantial side reactions. The polymer from the lithium chloride reaction was more melt stable.

TABLE III

| Reaction Time (hrs) | Polymer Inherent Viscosity After Time at 400° C. (min) | | | |
|---|---|---|---|---|
| | 0 | 5 | 30 | 60 |
| With Lithium Chloride | | | | |
| 6 | 1.08 | 1.08 | 1.24 | 1.19 |
| 8 | 1.09 | 1.12 | 1.15 | 1.30 |
| 10 | 1.11 | 1.14 | 1.12 | gel |
| 13 | 1.20 | — | 1.35 | — |
| 26 | 1.32 | 1.24 | 1.36 | 1.18 |
| 32 | 1.33 | 1.34 | 1.32 | gel |
| Without Lithium Chloride | | | | |
| 6 | 0.93 | 0.94 | — | 1.09 |
| 8 | 1.02 | 1.00 | 0.97 | gel |
| 10 | 1.05 | 1.13 | 1.18 | gel |
| 13 | 1.15 | 1.12 | 1.12 | gel |
| 26 | 1.72 | — | gel | — |
| 32 | 2.15 | — | gel | — |

EXAMPLE 19

The procedure of Example 17, workup A, was followed, with these exceptions: (1) p-phenoxybenzophenone (0.45 mole %) was the only capping agent and (2) the amount of 1,2-dichloroethane was adjusted to achieve the indicated per cent loading. For the purposes of this example, "per cent loading" is defined as 100 times the ratio of the theoretical yield (in grams) of polymer to the sum (in grams) of monomer, capping agent, Lewis acid, Lewis base, and solvent in the reaction mixture.

The results are tabulated below showing the effect of monomer concentration on inherent viscosity of the polymer.

TABLE IV

| Percent Loading | Polymer Inh. Visc. |
|---|---|
| 5 | 0.51 |
| 10 | 0.80 |
| 12 | 1.00 |
| 14 | 1.11 |
| 16 | 1.15 |
| 18 | 1.18 |
| 20 | 0.90 |

EXAMPLE 20 p-Phenoxybenzoyl chloride was polymerized as described in Example 17, workup B, except that no lithium chloride was used and p-phenoxy-benzophenone (0.45 mole %) was the only capping agent used. The results are provided in the table below which illustrate the effect of the amount of aluminum chloride on the inherent viscosity of the polymer.

TABLE V

| Molar Ratio of Aluminum Chloride to Monomer | Polymer Inherent Viscosity |
|---|---|
| 1.20 | 0.50 |
| 1.50 | 0.98 |
| 1.80 | 1.13 |
| 2.00 | 1.17 |
| 3.00 | 1.15 |

A comparison polymerization run with aluminum chloride: lithium chloride:p-phenoxybenzoyl chloride molar ratio of 3.0:1.5:1.0 gave an inherent viscosity of 1.15.

EXAMPLE 21

A reaction flask equipped with a magnetic stirrer and a nitrogen inlet was charged with methylene chloride (8 mL) and N,N-dimethylformamide (1.45 g, 20 mmol). Anhydrous aluminum bromide (13.33 g, 50 mmol) was added gradually, with cooling (exotherm ensues), followed by p-phenoxybenzoyl chloride (2.33 g, 10 mmol). Polymerization was allowed to proceed overnight at room temperature. The polymer was isolated by precipitating it into methanol and washing overnight at room temperature consecutively with methanol and water.

The polymer was a white powder with inherent viscosity 1.03. A slab pressed at 400° C. for 5 minutes was transparent and flexible.

EXAMPLE 22 p-Phenoxybenzoyl chloride was polymerized as in Example 17, workup A, except that (1) p-phenoxybenzophenone (0.45 mole %) was the only capping agent, (2) the "per cent loading" was adjusted to the levels given below by varying the amount of 1,2-dichloroethane used, and (3) no Lewis base was added. For the purposes of this example "per cent loading" is defined as 100 times the ratio of the theoretical yield (in grams) of polymer to the sum (in grams) of monomer, capping agent, Lewis acid, and solvent. The results are provided in the table below.

TABLE VI

| Percent Loading (%) | Inherent Visc. (dl/g) |
|---|---|
| 5 | 0.65–0.75 |
| 10 | 0.84–1.01 |
| 16 | 1.10–1.20 |

EXAMPLE 23

Diphenyl ether 4,4'-dicarbonyl dichloride was polymerized with diphenyl ether according to the procedure of Example 17, workup B, except that (1) the monomers were added directly to the reactor, instead of from a stock solution, (2) the equivalent ratio of aluminum chloride to acid halide groups was 2.0, (3) no lithium chloride was used, and (4) no capping agents were used.

The polymer obtained an inherent viscosity of 1.03.

EXAMPLE 24

Diphenyl ether 4,4'-dicarbonyl dichloride was polymerized with 1,4-diphenoxybenzene according to the procedure of Example 17, workup B, except that (1) the monomers were added directly to the reactor, instead of from a stock solution, (2) the equivalent ratio of aluminum chloride to acid halide groups was 2.0, (3) no lithium chloride was used, and (4) no capping agents were used.

The polymer obtained had an inherent viscosity of 0.93.

EXAMPLE 25

4,4'-Diphenoxybenzophenone was polymerized with terephthaloyl chloride, with and without added lithium chloride, according to the procedure of Example 17, workup A, with these exceptions: (1) the reactions were not capped; (2) aluminum chloride was added to a suspension of the monomers in 1,2-dichloroethane, instead of vice-versa; (3) where lithium chloride was used, it was used in the amount of 2.0 equivalents per equivalent of carbonyl groups in the reaction mixture; and (4) aluminum chloride was used in a 10 equivalent % excess over the total equivalents of carbonyl groups and lithium chloride.

The reaction with lithium chloride gave polymer with inherent viscosity 5.2 and the one without, 4.2. But samples contained some gel.

EXAMPLE 26

This example demonstrates the necessity for controlling the excess of aluminum chloride where the monomers used are terephthaloyl chloride and a comonomer as defined in I(ii)(a), I(ii)(b), or I(i)(d) and where the polymerization is conducted in the substantial absence of Lewis base.

Terephthaloyl chloride was polymerized with 1,4-diphenoxybenzene by the procedure of Example 17, workup A, with these exceptions: (1) no capping agents were employed, (2) the "per cent loading," as defined hereinbefore, was about 12% (Example 17 calculates to about 16), (3) no lithium chloride was added, and (4) the equivalent % excess of aluminum chloride was either 10 or 100, relative to the total equivalents of acid chloride groups present.

The reaction with only 10 equivalent % excess aluminum chloride gave polymer with inherent viscosity 1.59. The reaction with 100 equivalent % excess aluminum chloride gave polymer with inherent viscosity 0.18.

EXAMPLE 27

This example demonstrates the benefits of polymerizing terephthaloyl chloride with a comonomer as defined in I(ii)(a), I(ii)(b), or I(ii)(c) in the presence of a Lewis base.

Terephthaloyl chloride was polymerized with 1,4-diphenoxybenzene with and without lithium chloride added, according to the procedure of Example 17, workup A, with exceptions as noted: (1) the "percent loading," as defined hereinbefore, was about 12%, (2) the polymerizations were capped by employing 0.8 mole % excess of 1,4-diphenoxybenzene and 0.16 mole % of benzoyl chloride, (3) where lithium chloride was added, it was in the amount of 1 equivalent per equivalent of acid halide groups, and (4) the equivalent % excess of aluminum chloride over the sum of acid halide and lithium chloride equivalents was 10%.

The reaction with lithium chloride was homogeneous and gave polymer with inherent viscosity 0.91, while one without lithium chloride was heterogeneous and gave polymer of inherent viscosity 0.60.

We claim:

1. A method of producing a poly(arylene ether ketone) which comprises polymerizing a monomer system comprising:
(I)
  (i) phosgene or an aromatic diacid dihalide together with
  (ii) a polynuclear aromatic compound containing two active hydrogen atoms or
(II) a polynuclear aromatic compound containing both an acid halide group and an active hydrogen; in a reaction medium wherein Lewis base is substantially absent, comprising:
  (A) a Lewis acid in an amount of substantially one equivalent per equivalent of carbonyl groups present, plus an amount effective to act as a catalyst for the polymerization, and
  (B) a non-protic diluent in an amount from 0 to 93% by weight based on the weight of the total reaction mixture;
wherein
  (a) when the monomer system is (I) and compound (I)(ii) contains an undeactivated aryloxy group:
    (aa) the Lewis acid is present in excess of the minimum amount specified in (A) above by an amount of up to 0.8 equivalents per equivalent of undeactivated aryloxy groups present, and, if the acid halide groups are situated on separate non-fused aromatic rings, by an additional amount of up to 0.5 equivalents per equivalent of acid halide groups; and
    (bb) the concentration of monomers in the reaction mixture is at least 7% by weight, based on the total weight of the reaction mixture; with the further proviso that when the diacid dihalide (I)(i) is benzene dicarbonyl dichloride or diphenyl ether dicarbonyl dichloride and compound (I)(ii) is H—Ar—O—Ar—H wherein each Ar is independently selected from substituted or unsubstituted phenylene and substituted or unsubstituted polynuclear aromatic moieties free from ketone carbonyl and ether oxygen groups, the polymer produced is at least partially crystalline;
  (b) when the monomer system is (II) and contains an undeactivated aryloxy group, the Lewis acid is present in excess of the minimum specified in (A) above by an amount of up to 0.8 equivalent per equivalent of undeactivated aryloxy groups in the monomers; and
  (c) when the monomer system is either (I) or (II) and does not contain any undeactivated aryloxy groups, the Lewis acid is present in an amount in excess of the minimum specified in (A) above by at least

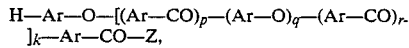

equivalents per equivalent of acid halide groups, where D is the molar ratio of monomer to diluent.

2. A method of producing a poly(arylene ether ketone) which comprises polymerizing a monomer system comprising:
(I)
  (i) phosgene or an aromatic diacid dihalide together with
  (ii) a polynuclear aromatic comonomer selected from the group consisting of:
    (a) H—Ar—O—Ar—H,
    (b) H—(Ar—O)$_n$—Ar—H, wherein n is 2 or 3,
    (c) H—Ar—O—Ar—(CO—Ar—O—Ar)$_m$—H, wherein m is 1, 2, or 3, and
    (d) H—(Ar—O)$_n$—Ar—CO—Ar—(O—Ar)$_m$—H, wherein m and n are as hereinabove defined;
(II) an acid halide of the formula:

H—Ar—O—[(Ar—CO)$_p$—(Ar—O)$_q$—(Ar—CO)$_r$—]$_k$—Ar—CO—Z, wherein Z is halogen; k is 0, 1, or 2; p is 1 or 2; q is 0, 1, or 2; and r is 0, 1, or 2; or
(III) an acid halide of the formula:

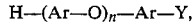

wherein Y is CO—Z or CO—Ar—CO—Z and n and Z are as hereinabove defined;
wherein each Ar is independently selected from substituted or unsubstituted phenylene, and substituted or unsubstituted polynuclear aromatic moieties free of ketone carbonyl and ether oxygen groups; in a reaction medium wherein Lewis base is substantially absent, comprising:
  (A) a Lewis acid in an amount of substantially one equivalent per equivalent of carbonyl groups present, plus an amount effective to act as a catalyst for the polymerization, and
  (B) a non-protic diluent in an amount from 0 to 93% by weight, based on the weight of the total reaction mixture;
wherein
  (i) when the monomer system includes a diacid dihalide and a comonomer as defined in (I)(ii)(a), (I)(ii)(b) or (I)(ii)(d) above:
    (aa) the Lewis acid is present in excess of the minimum specified in (A) above by an amount of up to 0.8 equivalent per equivalent of undeactivated aryloxy groups in the monomers, and, if the acid halide groups are situated on separate non-fused aromatic rings, by an additional amount of up to 0.5 equivalents per equivalent of acid halide groups, and
    (bb) the concentration of monomers in the reaction mixture is at least 7% by weight, based on the total weight of the reaction mixture; with the further proviso that when the monomer system includes a comonomer as defined in (I)(ii)(a) and the diacid dihalide is benzene dicarbonyl dichloride or diphenyl ether dicarbonyl dichloride, the polymer produced is at least partially crystalline; or (ii) when the monomer system is III, the Lewis acid is present in excess of the minimum specified in (A) above by an amount of up to 0.8 equivalent per equivalent of undeactivated aryloxy groups in the monomers; or (iii) when the monomer system is (II) or (I)(i) together with (I)(ii)(c), the Lewis acid is present in an amount in excess of the minimum specified in (A) above by at least $$0.6 + [0.25 \times \tanh(50(0.1 - D))]$$

equivalents per equivalent of acid halide groups, where D is the molar ratio of monomer to diluent.

3. A method in accordance with claim 1 or 2, wherein the Lewis acid is selected from the group consisting of aluminum trichloride, boron trichloride, aluminum tribromide, titanium tetrachloride, antimony pentachloride, ferric chloride, gallium trichloride, and molybdenum pentachloride.

4. A method in accordance with claim 3, wherein the Lewis acid is aluminum trichloride.

5. A method in accordance with claim 3, wherein the Lewis acid is aluminum tribromide.

6. A method in accordance with claim 1 or 2, wherein the polymerization is carried out in the presence of a non-protic diluent.

7. A method in accordance with claim 6, wherein the diluent has a dielectric constant of at least about 2.5 at 24° C.

8. A method in accordance with claim 6, wherein the diluent has a dielectric constant in the range of from about 4.0 to about 25 at 24° C.

9. A method in accordance with claim 6, wherein the diluent is selected from the group consisting of methylene chloride, carbon disulfide, o-dichlorobenzene, 1,2,4-trichlorobenzene, o-difluorobenzene, 1,2-dichloroethane, 1,2,3,4-tetrachloroethane, and tetrachloroethylene.

10. A method in accordance with claim 1 or 2, wherein a capping agent is added to the reaction medium.

11. A method in accordance with claim 10, wherein both a nucleophilic and an electrophilic capping agent are added to the reaction medium.

12. A method in accordance with claim 11, wherein the nucleophilic capping agent is selected from the group consisting of 4-chlorobiphenyl, 4-phenoxybenzophenone, biphenyl, 4-(4-phenoxyphenoxy)benzophenone, and 4-benzenesulfonylphenyl phenyl ether.

13. A method in accordance with claim 11, wherein the electrophilic capping agent is selected from the group consisting of benzoyl chloride and benzenesulfonyl chloride.

14. A method in accordance with claim 2, wherein the monomer system comprises phosgene or an aromatic diacid dihalide together with a polynuclear aromatic comonomer of the formula $$\text{H—Ar—O—Ar—H}$$

15. A method in accordance with claim 14, wherein the monomer system comprises terephthaloyl or isophthaloyl chloride or mixtures thereof and diphenyl ether.

16. A method in accordance with claim 14, wherein the Lewis acid is aluminum trichloride.

17. A method in accordance with claim 14, wherein the concentration of monomers in the reaction medium is at least about 10% based on the total weight of the reaction mixture.

18. A method in accordance with claim 14, wherein the concentration of the monomers in the reaction medium is at least about 15% by weight based on the total weight of the reaction mixture.

19. A method in accordance with claim 14, wherein the polymerization is conducted at a temperature in the range of −30° C. to +25° C.

20. A method in accordance with claim 2, wherein the monomer system comprises phosgene or an aromatic diacid dihalide together with a polynuclear aromatic comonomer of the formula $$\text{H—(Ar—O)}_n\text{—Ar—H}$$

21. A method in accordance with claim 20, wherein the monomer system comprises terephthaloyl chloride and 1,4-diphenoxybenzene.

22. A method in accordance with claim 20, wherein the Lewis acid is aluminum trichloride.

23. A method in accordance with claim 20, wherein the concentration of the monomers in the reaction medium is at least about 10% based on the total weight of the reaction mixture.

24. A method in accordance with claim 20, wherein the concentration of monomers in the reaction medium is at least about 15% by weight based on the total weight of the reaction mixture.

25. A method in accordance with claim 20, wherein the polymerization is conducted at a temperature in the range of −30° to +25° C.

26. A method in accordance with claim 2, wherein the monomer system comprises phosgene or an aromatic diacid dihalide together with a polynuclear aromatic comonomer of the formula $$\text{H—Ar—O—Ar—(CO—Ar—O—Ar)}_m\text{—H}$$

27. A method in accordance with claim 26, wherein the monomer system comprises terephthaloyl chloride and 1,4-diphenoxybenzophenone.

28. A method in accordance with claim 26, wherein the Lewis acid is aluminum trichloride.

29. A method in accordance with claim 26, wherein the concentration of the monomers in the reaction medium is at least about 10% based on the total weight of the reaction mixture.

30. A method in accordance with claim 26, wherein the polymerization is conducted at a temperature in the range of −30° to +25° C.

31. A method in accordance with claim 2, wherein the monomer system comprises phosgene or an aromatic diacid dihalide together with a polynuclear aromatic comonomer of the formula $$\text{H—(Ar—O)}_n\text{—Ar—CO—Ar—(O—Ar)}_m\text{—H}$$

32. A method in accordance with claim 31, wherein the monomer system comprises phosgene and bis(phenoxyphenoxy)benzophenone.

33. A method in accordance with claim 31, wherein the Lewis acid is aluminum trichloride.

34. A method in accordance with claim 31, wherein the concentration of monomers in the reaction medium is at least about 10% by weight based on the total weight of the reaction mixture.

35. A method in accordance with claim 31, wherein the concentration of monomers in the reaction medium is at least about 15% by weight based on the total weight of the reaction mixture.

36. A method in accordance with claim 31, wherein the polymerization is conducted at a temperature in the range of −30° to +25° C.

37. A method in accordance with claim 2, wherein the monomer system comprises an acid halide of the formula

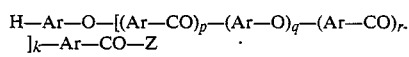

38. A method in accordance with claim 37, wherein the monomer system comprises p-phenoxybenzoyl chloride.

39. A method in accordance with claim 37, wherein the Lewis acid is aluminum trichloride.

40. A method in accordance with claim 37, wherein the concentration of monomers in the reaction medium is at least about 10% by weight based on the total weight of the reaction mixture.

41. A method in accordance with claim 37, wherein the polymerization is conducted at a temperature in the range of −30° to +25° C.

42. A method in accordance with claim 2, wherein the monomer system comprises an acid halide of the formula

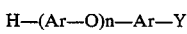

43. A method in accordance with claim 42, wherein the monomer system comprises p-phenoxy-p-phenoxybenzoyl chloride.

44. A method in accordance with claim 42, wherein the Lewis acid is aluminum trichloride.

45. A method in accordance with claim 42, wherein the polymerization is conducted at a temperature in the range of −30° to +25° C.

* * * * *